(12) United States Patent
Chen

(10) Patent No.: US 8,743,816 B2
(45) Date of Patent: Jun. 3, 2014

(54) SCHEDULING METHOD AND SYSTEM

(75) Inventor: Si Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/520,035

(22) PCT Filed: Feb. 18, 2011

(86) PCT No.: PCT/CN2011/071101
§ 371 (c)(1),
(2), (4) Date: Jun. 29, 2012

(87) PCT Pub. No.: WO2011/127764
PCT Pub. Date: Oct. 20, 2011

(65) Prior Publication Data
US 2013/0021988 A1    Jan. 24, 2013

(30) Foreign Application Priority Data

Apr. 12, 2010  (CN) .......................... 2010 1 0146487

(51) Int. Cl.
*H04W 4/00* (2009.01)
*H04W 72/12* (2009.01)
(52) U.S. Cl.
CPC ................................ *H04W 72/1289* (2013.01)
USPC ........................................... 370/329; 370/315
(58) Field of Classification Search
USPC .................................................. 370/329–341
See application file for complete search history.

(56) References Cited

U.S. PATENT DOCUMENTS

| | | | | |
|---|---|---|---|---|
| 7,675,942 | B2 * | 3/2010 | Lee et al. | 370/474 |
| 8,380,213 | B2 * | 2/2013 | Cai et al. | 455/450 |
| 8,532,599 | B2 * | 9/2013 | DiGirolamo et al. | 455/229 |
| 2013/0094482 | A1 * | 4/2013 | Kim et al. | 370/336 |
| 2013/0182679 | A1 * | 7/2013 | Seo et al. | 370/330 |

FOREIGN PATENT DOCUMENTS

| | | |
|---|---|---|
| CN | 101330372 A | 12/2008 |
| CN | 101605356 A | 12/2009 |
| WO | 2009102906 A1 | 8/2009 |

OTHER PUBLICATIONS

International Search Report for PCT/CN2011/071101 dated May 2, 2011.

* cited by examiner

*Primary Examiner* — Kan Yuen
(74) *Attorney, Agent, or Firm* — Ling Wu; Stephen Yang; Ling and Yang Intellectual Property

(57) ABSTRACT

A scheduling method is disclosed by the present invention, and the method includes: a network element 1 transmitting downlink message to a network element 2, and scheduling the network element 2 to transmit or receive data over a plurality of subframes; according to the downlink message, the network element 2 using same scheduling information or different scheduling information to transmit or receive data over the plurality of subframes. A scheduling system is also disclosed by the present invention, and the system includes: a scheduling unit which is used to transmit downlink message to the network element 2 by the network element 1, and schedule the network element 2 to transmit or receive data over a plurality of subframes. With the method and system of the present invention, the scheduling for various network elements can be realized compatibly.

13 Claims, 2 Drawing Sheets

SCHEDULING METHOD AND SYSTEM

TECHNICAL FIELD

The present invention relates to the communication field, and in particular, to a scheduling method and system.

BACKGROUND OF THE RELATED ART

The evolved universal terrestrial radio access network (E-UTRAN) of the third generation mobile communication long term evolution (LTE) is composed of the enhanced base station (eNB), which supports the hybrid automatic repeat request (HARQ) function and is used for improving the reliability of successful transmission. The user equipment (UE) has an HARQ entity in downlink and uplink respectively, and the HARQ entity supports the plurality of HARQ processes and follows parallel stop-and-wait protocol. The HARQ information mainly includes: HARQ process information, new data indicator (NDI) information and redundancy version information. The uplink supports the synchronous HARQ, implying that the HARQ process identifier can be obtained according to the subframe number. The downlink supports the asynchronous HARQ, implying that the HARQ process identifier is indicated according to the downlink control information (DCI). The first transmission of the HARQ and the retransmission of the HARQ use the same HARQ process.

The E-UTRAN supports the dynamic scheduling. The dynamic scheduling refers to that E-UTRAN can dynamically allocate the resource to the UE through the cell radio network temporary identifier (C-RNTI) on the physical downlink control channel (PDCCH) at each transmit time interval (TTI) corresponding to one subframe, for example, the physical resource block (PRB) and modulation and coding scheme (MCS), etc. The PDCCH mainly carries the resource allocation information, mainly including the information such as the resource block (RB) allocation information, the MCS, the HARQ information, etc. In uplink, the UE generates data packets according to the information and sends the data packets to the base station through the physical uplink shared channel (PUSCH). The E-UTRAN sends for the data packets the acknowledgement response message (ACK)/non-acknowledgement response message (NACK) of the feedback hybrid automatic repeat request through the physical HARQ indicator channel (PHICH). In the downlink, the UE receives in the physical downlink shared channel (PDSCH) the data packets sent by the base station according to the information. The UE sends the ACK/NACK of the feedback hybrid automatic repeat request for the data packets through the PUSCH or the physical uplink control channel (PUCCH).

The E-UTRAN also supports the semi-persistent scheduling. The semi-persistent scheduling is suitable for the service of which the data packet is minor and the transmission time interval is relatively fixed, and the purpose is to reduce the signaling expense. The semi-persistent scheduling refers to that: the E-UTRAN can semi-persistently allocate the resource through the special C-RNTI on the PDCCH to the UE, including the PRB and the MCS, etc. The resource can only be used for the first transmission of the HARQ, and the resource can be reused periodically, and the typical period is 20 ms. When needed, the retransmission information is indicated with the explicit signaling through the PDCCH, that is, the retransmission of the HARQ retransmission uses the dynamic scheduling. The semi-persistent scheduling is initially configured by the radio resource control (RRC) signaling, for example, allocating the period of the semi-persistent scheduling. Wherein, the special C-RNTI and C-RNTI used by the dynamic scheduling are different.

In the uplink, the E-UTRAN also supports the TTI bundling. The TTI bundling is suitable for the users of the cell border, and the purpose is to improve the reliability of the successful transmission. The UTRAN allocates the resource for the first transmission and the retransmission of the HARQ sent by the UE, including PRB and MCS, etc. Once the TTI bundling is configured, that is, one group of subframes are configured, the UE utilizes the same resource to send the first transmission and the retransmission of the HARQ in this one group of subframe, meaning that the C-RNTI used to allocate the resource each time is not only used for the first transmission of the HARQ but also used for the retransmission of the HARQ. No matter the uplink transmission in the bundling is successful or not, the continuous subframes of the UE in the bundling are in one group of TTIs, and the UE occupies an identical HARQ process to transmit the uplink data, including the first transmission and a plurality of non-adaptive retransmissions, and the UD does not need to judge whether the last transmission is successful when retransmitting. The moment of the feedback for the uplink data is based on the last subframe of this group of the TTIs.

At present, the third generation partnership projects (3GPP) introduces the long term evolution advance (LTE-A) standard. Wherein, the wireless relay technology is one of the technologies in the LTE-A, which aims at expanding the coverage area of the cell, reducing the corner area in the communication, balancing the load, transferring the service of the hot spot area, and saving the transmitting power of the UE.

FIG. 1 is a structure diagram of the network utilizing the wireless relay technical in the related art. As shown in FIG. 1, some new relay nodes (RN) are added between the original base station (Donor-eNB) and the UE, and these newly-added RNs and Donor-eNB are connected wirelessly, and there is no wired connection with the transmission network. Wherein, the wireless link between the Donor-eNB and the RN is called a backhaul link, and also can be called the $U_n$ interface; and the wireless link between the RN and the UE is called an access link. The downlink data reaches the Donor-eNB firstly, and then the data are transmitted to the RN, and the RN transmits the data to the UE; and in the uplink, it is just on the opposite, which will no longer be described in details here.

In order to configure the resources of the backhaul link, it is to define the relay-physical dedicated downlink control channel (R-PDCCH), the relay-physical dedicated downlink shared channel (R-PDSCH) and the relay-physical dedicated uplink shared channel (R-PUSCH). The R-PDCCH can schedule the RN to receive the data on the R-PDSCH in one or more $U_n$ downlink subframes, and the R-PDCCH can schedule the RN to receive the data on the R-PUSCH in one or more $U_n$ uplink subframes.

The base station schedules the RN to transmit/receive the date in a plurality of $U_n$ uplink subframes through the R-PDCCH, thus saving the signaling expense of the R-PDCCH. In the case that the service volume of the UE of the macro cell increases, the base station can use this part of saved resources to schedule the transmission of the UE of the macro cell.

In the current scheduling technology, when transmitting in a plurality of subframes, the UE adopts the two kinds of scheduling ways, i.e. the above-mentioned semi-persistent scheduling and the above-mentioned TTI bundling, to perform the scheduling, but these two kinds of scheduling ways used by the UE when transmitting in a plurality of subframes are not suitable for scheduling the network element in the wireless relay system.

Taking the network element in the wireless relay system as an example, since the data of the RN is integrated with the data of one or more UEs of the relay cell, the data packet is relatively large, and the time interval is unfixed, while the semi-persistent scheduling way aims at the service of which the data packet is minor and the transmission time interval is relatively fixed, thus the RN does not possess the characteristic of the service applied for the semi-persistent scheduling, so the current above-mentioned semi-persistent scheduling is not suitable for scheduling the RN. In addition, the signal channel quality of the backhaul link is relatively good, so the retransmission probability of the RN is relatively low, and the TTI bundling way aims at a user at the border of the cell, of which the transmission success rate is low and the retransmission probability is high, and uplink subframe resource of the $U_n$ is limited, thus, if adopting the TTI bundling way, the uplink resource of the $U_n$ will be wasted, so the current above-mentioned TTI bundling is not suitable for scheduling the RN either.

In a word, the current ways of both the semi-persistent scheduling and the TTI bundling are not suitable for scheduling the RN, that is to say, after introducing the radio relay technology, the current scheduling way is still adopted to perform the scheduling, the scheduling for various network elements, such as, the UE, the RN, etc. can not be achieved compatibly. Now one scheduling solution which can be suitable for scheduling all kinds of the network elements commonly is needed urgently.

SUMMARY OF THE INVENTION

In view of above, the main objective of the present invention is to provide a scheduling method and system, which can be commonly suitable for scheduling various network elements and has the compatibility.

In order to achieve the above-mentioned objective, the technical scheme of the present invention is implemented as follows:

a scheduling method, comprising:

a network element 1 transmitting downlink message to a network element 2, and scheduling the network element 2 to transmit or receive data over a plurality of subframes; and the network element 2, according to the downlink message, transmitting or receiving data over the plurality of subframes by using same scheduling information or different scheduling information.

Wherein, before the network element 1 transmits the downlink message to the network element 2, the method further comprises: the network element 1 transmitting a radio resource control (RRC) signaling or a media access control (MAC) control element which carries information about the number of the plurality of subframes to the network element 2; or, information about the number of the plurality of subframes is preset in a protocol.

Wherein, the method further comprises:

when the downlink message carries one piece of scheduling information, the network element 2 transmitting or receiving data over the plurality of subframes by using same scheduling information; or when the downlink message carries a plurality of pieces of scheduling information, the network element 2 transmitting or receiving data over the plurality of subframes by using different scheduling information.

Wherein, the scheduling information comprises: at least one of resource block information, modulation and coding scheme information, transmitting power information, new data indicating information, redundancy version information and hybrid automatic repeat request (HARD) process information.

Wherein, the downlink message is downlink control information (DCI) indicated by a radio network temporary identifier (C-RNTI), or DCI indicated by a dedicated C-RNTI, or dedicated DCI indicated by a C-RNTI, or dedicated DCI indicated by a dedicated C-RNTI.

Wherein, when the downlink message is the DCI indicated by the C-RNTI, the method further comprises: before the network element 1 transmits the downlink message to the network element 2, the network element 1 transmitting an RRC signaling or the MAC control element carrying identification information which activates the scheduling to the network element 2.

Wherein, the method further comprises: the dedicated C-RNTI being carried in an RRC signaling or a MAC control element; and the network element 1 transmitting the RRC signaling or the MAC control element to the network element 2.

Wherein, the dedicated DCI comprises any one or a combination of at least one of the following information:

the information 1: carrying an identifier indicating to start the scheduling;

the information 2: the number of the plurality of subframes;

the information 3: a plurality of pieces of associated resource information when the network element 2 transmits or receives the data over the plurality of subframes;

the information 4: a plurality of pieces of associated HARQ information when the network element 2 transmits or receives the data over the plurality of subframes.

Wherein, the resource information comprises: at least one of resource block information, modulation and coding scheme information, and transmitting power information; and the HARQ information comprises: at least one of new data indicating information, redundancy version information, and HARQ process information.

Wherein, the method further comprises: the network element 1 explicitly or implicitly performing schedule indicating, to schedule the network element 2 to transmit or receive the data over one subframe; or to schedule the network element 2 not to transmit or receive the data.

Wherein, the method further comprises: transmitting the downlink message to the network element 2 through the network element 1 to perform the schedule indicating explicitly.

Wherein, the method further comprises: performing the schedule indicating implicitly by judging whether a timer maintained by the network element 2 is expired; when determining that the timer maintained by the network element 2 is expired, scheduling the network element 2 to transmit or receive the data over one subframe; or, scheduling the network element 2 not to transmit or receive the data.

A scheduling system, comprising: a scheduling unit and a transmitting/receiving unit; wherein, the scheduling unit is configured to transmit downlink message to a network element 2 by a network element 1, and schedule the network element 2 to transmit or receive data over a plurality of subframes; and the transmitting/receiving unit is configured, according to the downlink message, to transmit or receive the data over the plurality of subframes by using same or different scheduling information by the network element 2.

Wherein, the scheduling unit is further configured to explicitly or implicitly perform schedule indicating by the network element 1 to schedule the network element 2 to transmit or receive the data over one subframe; or, schedule the network element 2 not to transmit or receive the data.

Wherein, the scheduling unit is further configured to transmit the downlink message to the network element 2 through the network element 1 to perform the schedule indicating explicitly;

or the scheduling unit is further configured to perform the schedule indicating implicitly by judging whether a timer maintained by the network element 2 is expired.

The network element 1 of the present invention transmits the downlink message to the network element 2, and schedules the network element 2 to transmit or receive data over the plurality of subframes; the network element 2 transmits or receives data over the plurality of sub-frames by using the same or different scheduling information according to the downlink message.

Adopting the present invention, it can be commonly suitable for scheduling various network elements and has the compatibility. For example, it can make the network element 1, such as the base station, in the radio relay system schedule the network element 2, such as the RN, in the radio relay system, to transmit data over a plurality of $U_n$ uplink subframes, or schedule the RN to receive data over a plurality of downlink $U_n$ subframes; and also can perform the scheduling for the UE to transmit data over a plurality of uplink subframes or receive the data over a plurality of downlink subframes.

PREFERRED EMBODIMENTS OF THE PRESENT INVENTION

Figure 1:
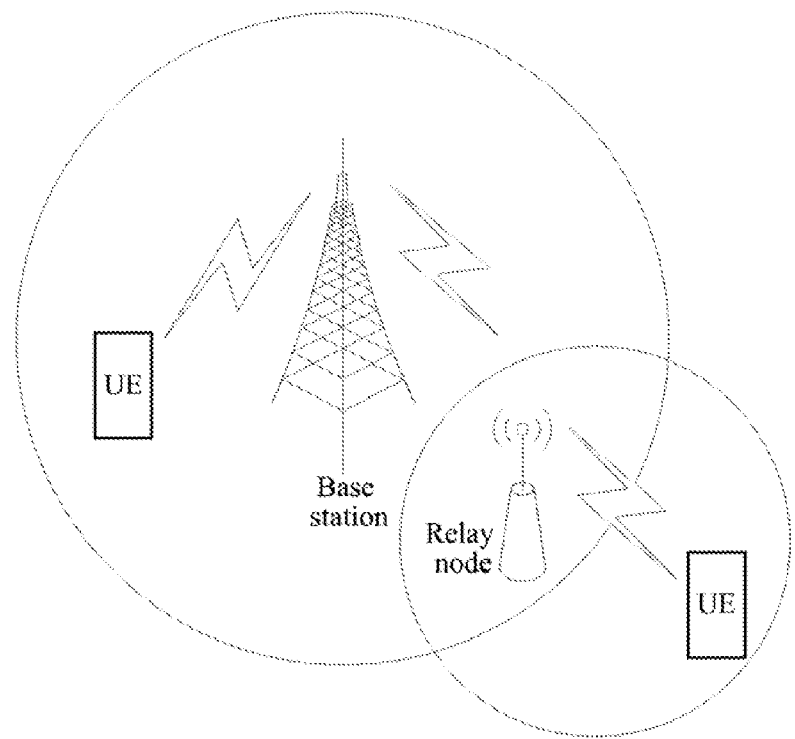
FIG. 1 is a structure diagram of a network utilizing a wireless relay technical in the related art.

The basic idea of the present invention is: a network element 1 transmitting downlink message to a network element 2, and scheduling the network element 2 to transmit or receive data over a plurality of subframes; and the network element 2, according to the downlink message, using same or different scheduling information to transmit or receive data over the plurality of subframes.

The implementation of the technical scheme is further described in detail combining with the accompanying drawings hereinafter.

A scheduling method mainly includes:
the network element 1 transmitting the downlink message to the network element 2, and scheduling the network element 2 to transmit or receive data over a plurality of subframes; and the network element 2, according to the downlink message, using same or different scheduling information to transmit or receive data over the plurality of subframes. Wherein, when the network element 2 is an RN, the plurality of subframes can be a plurality of $U_n$ subframes.

Further, before the network element 1 transmits the downlink message to the network element 2 or at the same time, the network element 1 configures the related configuration information for the network element 2, including: the number of the plurality of subframes. And it also includes a dedicated C-RNTI, and/or a duration of a timer indicating the effective time of the scheduling. Or the number of the plurality of subframes is preset in a protocol, further including: before transmitting the downlink message or at the same time, the network element 1 configures the related configuration information for the network element 2, including: the dedicated C-RNTI, and/or the duration of the timer indicating the effective time of the scheduling.

Further, the downlink message includes: a radio resource control (RRC) signaling or a media access control (MAC) control element, or a dedicated DCI. Wherein, the RRC signaling is a RRC signaling carrying the number of the subframes and/or an identifier indicating to start the scheduling. The RRC signaling includes RRC connection reconfiguration message. The MAC control element is an MAC control element carrying the number of the subframes and/or the identifier indicating to start the scheduling. Here it needs to point out that: although the RRC signaling and the MAC control element belong to different protocol layers, the carried contents are coincident. In the carried contents, the identifier indicating to start the scheduling, for example, is a true and false value, and if the identifier is a true value (that is, equals 1, or is TRUE), then indicating to start the scheduling; if the identifier is a false value (that is, equals 0, or is FALSE), then indicating the scheduling is over.

Further, the dedicated DCI comprises any one or a combination of at least one of the following information:
the information 1: carrying an identifier indicating to start to schedule;
the information 2: the number of the plurality of subframes;
the information 3: a plurality of pieces of associated resource information when the network element 2 transmits or receives the data over the plurality of subframes;
the information 4: a plurality of pieces of associated HARQ information when the network element 2 transmits or receives the data over the plurality of subframes. The resource information refers to: the resource block information, the modulation and coding scheme information, and the transmitting power information. The HARQ information refers to: the redundancy version information, and the HARQ process information.

Further, if the downlink message is a RRC signaling or an MAC control element, the network element 1 also transmits the DCI to the network element 2, to indicate the network element 2 to transmit or receive the resource information and the HARQ information related to the data over the plurality of subframes.

The resource information refers to: at least one of the resource block information, the modulation and coding scheme information, and the transmitting power information. The HARQ information refers to: at least one of the new data indicating information, the redundancy version information, and the HARQ process information.

Further, the network element 1 explicitly or implicitly indicates the network element 1 to finish scheduling the network element 2 to transmit or receive the data over the plurality of subframes. That is to say, the network element 1 explicitly or implicitly performs schedule indicating, to schedule the network element 2 to transmit or receive data over one subframe; or, schedule the network element 2 not to transmit or receive data.

Explicitly indicating means: transmitting the downlink message to the network element 2 directly through the network element 1 to perform the schedule indicating, and scheduling the network element 2 to transmit or receive data over one subframe; or scheduling the network element 2 not to transmit or receive data; implicitly indicating means: performing implicitly the schedule indicating by judging whether a timer maintained by the network element 2 is expired, that is to say, once determining that the timer maintained by the network element 2 is expired, then scheduling the network element 2 to transmit or receive data over one subframe; or, scheduling the network element 2 not to transmit or receive data.

Further, when explicitly indicating, there is a corresponding relationship between the downlink message indicating to finish the scheduling and the downlink message indicating to start the scheduling. If the downlink message indicating to start the scheduling is the RRC signaling or the MAC control element carrying the identifier indicating to start the scheduling, then the downlink message indicating to finish the scheduling is the RRC signaling or the MAC control element carrying the identifier indicating to finish the scheduling; otherwise, if the downlink message indicating to start the scheduling is a RRC signaling or MAC control element carrying the number of the subframes which is greater than 1, then the downlink message indicating to finish the scheduling is the RRC signaling or MAC control element carrying the number of the subframes which equals 1. If the downlink message indicating to start the scheduling is a dedicated DCI, then the downlink message indicating to finish the scheduling is the DCI in the current format, or the dedicated DCI without carrying the resource block information. If the downlink message indicating to start the scheduling is a dedicated DCI carrying the identifier indicating to start the scheduling, then the downlink message indicating to finish the scheduling is the dedicated DCI carrying the identifier indicating to finish the scheduling.

In conclusion, the scheduling method provided by the present invention is: the network element 1 transmitting the downlink message to the network element 2, to indicate the network element 1 to start adopting the scheduling method described in the present invention to schedule the network element 2 to transmit or receive data over a plurality of subframes. In the specific scheduling process, the network element 1 transmits the DCI to the network element 2, indicating the resource information, HARQ information, etc., used by the network element 2 over the plurality of subframes. The network element 2 can use the same resource information and HARQ information in different subframes; and also can use different resource information and HARQ information. Through explicitly indicating or implicitly indicating, the network element 1 is indicated to adopt the scheduling method of the present invention to schedule the network element 2 to transmit or receive data over a plurality of subframes.

The present invention is described taking examples hereinafter.

The embodiment one: what the present embodiment describes is that the network element 2 obtains the situation of the resource information, HARQ information, etc., used in the plurality of subframes through the C-RNTI, wherein, the resource information, HARQ information, etc. are transferred in current DCI format.

In step 1, the network element 1 transmits the downlink message to the network element 2, indicating that the network element 1 starts to adopt the scheduling method described in the present invention to schedule the transmitting of the network element 2.

Here, the downlink message is the RRC signaling or the MAC control element carrying the number of the subframes and and/or the identifier indicating to start adopting the scheduling method of the present invention. Here, "carrying the number of the subframes and/or indicating to start adopting the scheduling method of the present invention" is abbreviated as identifier hereinafter. The RRC signaling can be the RRC connection reconfiguration message, and will not go into details hereinafter.

Here, the number of the subframes is necessary configuration information, indicating the number of the plurality of subframes when the network element 1 adopts the scheduling method of the present invention to schedule the network element 2 to transmit over the plurality of subframes. If the downlink message only carries the identifier but not carries the number of the subframes, it means that before this step, the number is already obtained by the network element 2 through the protocol predefining, or the RRC signaling or the MAC control element. If the downlink message carries the number of the subframes, then the number of the subframes is greater than 1. The number of the subframes in the present embodiment is 3.

In step 2, the network element 2 obtains the DCI sent by the network element 1 through the C-RNTI over the downlink control channel, indicating the network element 2 to perform the first transmission of the HARQ. The C-RNTI in this case is the same as that in dynamic scheduling.

Here, the DCI is in current DCI format, for example, the uplink adopts the DCI format 0, and the downlink adopts the DCI format 1.

In step 3, the network element 2 performs the first transmission of the HARQ over designated subframe according to the resource information HARQ information, etc., carried in the DCI.

Here, the resource information mainly includes the resource block information, the MCS information and the transmitting power information. The HARQ information mainly includes the NDI information, the RV information, and may also include the HARQ process information under the situation of the asynchronous HARQ.

Here, the behavior of the network element 2 over the designated subframe is similar to the behavior in dynamic scheduling, and the difference lies in that the network element 2 keeps the information, such as the resource information, HARQ information, etc. carried in the DCI, until the number of the subframes is reached. This means that the network element 2 will still perform the first transmission of the HARQ over the continuous subframes following the designated subframe according to the same resource information. Especially, as to the backhaul link, the subframe number of the $U_n$ uplink subframe is discontinuous, and if there is no other $U_n$ uplink subframe between two $U_n$ uplink subframes, then these two $U_n$ uplink subframes are called the continuous $U_n$ uplink subframes. Similarly, if there is no other $U_n$ downlink subframe between two $U_n$ downlink subframes, then these two Un subframes are called the continuous Un downlink subframes.

Here, since the first transmission of the HARQ is performed, that is, the NDI changes, and the RV is 0, the network element 2 is able to not keep the information of NDI and RV.

Here, in the case of the asynchronous HARQ, the network element 2 performing the transmission over the continuous subframes also needs the HARQ process information. The HARQ process identifier used by the network element 2 over the continuous subframe is the HARQ process identifier used in the designated subframe which is denoted in ascent order, or before step 2, the network element 1 transmits the related configuration information indicating the HARQ process identifier to the network element 2 through the downlink message such as the RRC signaling or the MAC control element, and the network element 2 can obtain the HARQ process identifier used in the continuous subframe according to the configuration information, and may also indicate the HARQ process identifier used in the designated subframe.

Figure 2:
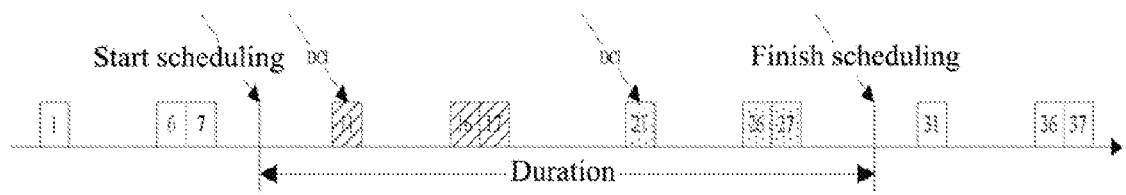
FIG. 2 is a scheduling diagram of embodiment 1 of the present invention.

Here, as shown in FIG. 2, one radio frame includes 10 subframes. Hereinafter, in order to describe simply, the subframes are denoted in ascent order in turn, that is, if the subframes 1, 2 of the radio frame x are denoted as subframes 1, 2, so the subframes 1, 2 of the radio frame (x+1) are denoted as 11, 12. In FIG. 2, a series of continuous subframes are illustrated. The network element 2 performs the first transmission of the HARQ over the subframe 11 according to the DCI, and performs the first transmission of the HARQ over the subframes 16, 17 according to the kept resource.

Figure 3:
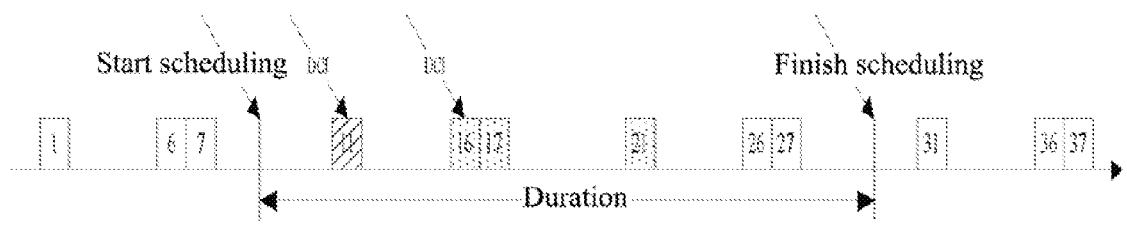
FIG. 3 is a scheduling diagram of embodiment 1 of the present invention.

Here, if there is the kept resource information, HARQ information, etc. in the designated subframe, then the network element 2 deletes the kept information, and performs the first transmission of the HARQ according to the resource information, HARQ information, etc., indicated by the DCI. This means that the network element 1 updates the resource information, HARQ information, etc. of the scheduling, and the designated subframe is the first subframe of this scheduling. As shown in FIG. 3, in the case that the network element 1 schedules the network element 2 to perform the first transmission of the HARQ over the subframes 11, 16, 17 last time and when the scheduling is not finished yet, the network element 1 updates the information of the scheduling, and reschedules the network element 2 to perform the first transmission of the HARQ over the subframes 16, 17, 21.

In step 4, the network element 1 transmits the downlink message to the network element 2, indicating that the network element 1 finishes adopting the scheduling method described in the present invention to schedule the transmission of the network element 2.

Here, the downlink message indicating to finish has a corresponding relationship with the downlink message indicating to start in step 1. If the downlink message indicating to start is the RRC signaling and the MAC control element carrying the identifier indicating to start the present scheduling method, then the downlink message indicating to finish is the RRC signaling and the MAC control element carrying the identifier indicating to finish the present scheduling method; otherwise, if the downlink message indicating to start is the RRC signaling or the MAC control element carrying the number of the subframes which is greater than 1, then the downlink message indicating to finish is the RRC signaling or the MAC control element carrying the number of the subframes which equals 1.

Figure 4:
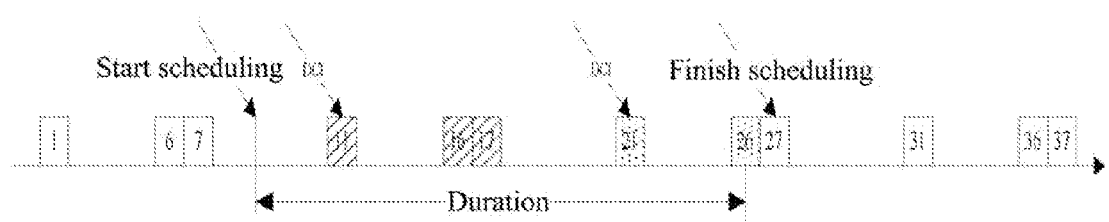
FIG. 4 is a scheduling diagram of embodiment 1 of the present invention.

Here, if the network element 2 has the kept resource information, HARQ message, etc. when receiving the downlink message, it indicates that the network element 1 also transmits the DCI to indicate the network element 2 to perform the first transmission of the HARQ before transmitting the downlink messaging, as shown in step 2; while the network element 2 has not finished the first transmission of the HARQ over the plurality of subframes yet, then the network element 2 deletes the kept resource information, HARQ information, etc., because the network element 1 requires to finish the present scheduling method through the explicit information. As shown in FIG. 4, the network element 1 schedules the network element 2 to perform the first transmission of the HARQ over the subframes 21, 26, 27, then the network element 1 indicates to finish adopting the present scheduling method, and then the network element 2 does not perform the first transmission of the HARQ over the subframes 26, 27, unless the network element 1 adopts other scheduling methods to schedule the network element 2 to perform the first transmission of the HARQ over the subframes 26, 27.

The embodiment two: what the present embodiment describes is the situation that the network element 2 obtains the resource information, HARQ information, etc., used in the plurality of subframes through the dedicated C-RNTI, wherein, the resource information, HARQ information, etc. is transferred in the current DCI format.

In step 1, based on step 1 of the embodiment one, the downlink message or the downlink message sent to the network element 2 by network element 1 before step 1 carries the dedicated C-RNTI of the scheduling method of the present invention. Here, the C-RNTI is different from that in the embodiment one, and is a C-RNTI different from that of the dynamic scheduling.

In step 2, the network element 2 obtains the DCI sent by the network element 1 through the dedicated C-RNTI on the downlink control channel, to indicate the network element 2 to perform the transmission.

Here is the transmission is the first transmission or retransmission of the HARQ.

In step 3, based on step 3 of the embodiment one, if it is HARQ retransmission, then the RV adopted by the network element 2 in the continuous subframe is the RV adopted by the designated subframe, or the RV indication adopted by the last transmission according to the corresponding HARQ process, which is similar to the behavior of the non adaptive retransmission.

In step 4, it is similar to the embodiment one, and will not go into details one by one again.

Here, in the embodiment one and embodiment two, the way for indicating that the network element 1 finishes adopting the scheduling method described in the present invention to schedule the transmission of the network element 2 may also be implicit, for example, the network element 2 maintains the timer. After the network element 2 receives the downlink message in step 1 or starts the scheduling method described in the present invention, the network element 2 starts or restarts the timer when receiving the first DCI in step 2, and if the timer is expired, then the network element 2 considers that the network element 1 finishes adopting the scheduling method of the present invention to schedule the network element 2.

Here, the downlink message or the downlink message sent to the network element 2 by network element 1 before step 1 carries the duration of the timer, which indicates the effective time of the scheduling method of the present invention.

Figure 5:
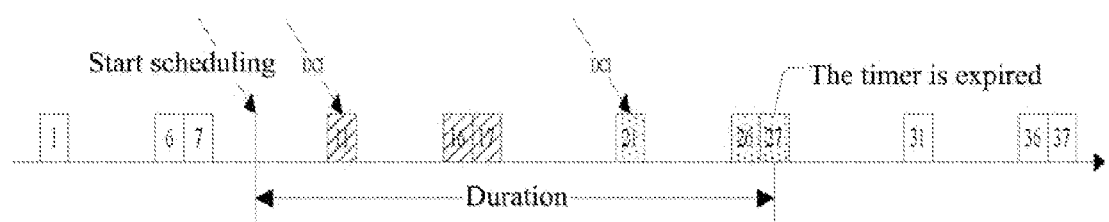
FIG. 5 is a scheduling diagram of embodiments 1 and 2 of the present invention.

Here, if the network element 2 has the kept resource information, HARQ information, etc. when timer is expired, it indicates that the DCI is transmitted to indicate the network element 2 to perform the first transmission of the HARQ before the timer is expired, as shown in step 2, while the network element 2 has not finished the transmission over the plurality of subframes yet, then the network element 2 considers that the network element 1 finishes adopting the scheduling method of the present invention to schedule the network element 2 after finishing this transmission over the plurality of subframes, as shown in FIG. 5, the network element 1 schedules the network element 2 to perform the first transmission of the HARQ over the subframes 21, 26, 27, then the timer is expired on the subframe 26, and then the network element 2 continues to transmit over the subframes 26, 27, that is, the timer lengthens to the subframe 27. In the embodiment one, if the network element 2 receives the DCI indicated by the C-RNTI and performs the first transmission of the HARQ after the subframe 27, then the network element 2 does not keep the resource information and the HARQ information carried by the DCI as the processing in the dynamic scheduling. In the embodiment two, if the network element 2 receives the DCI indicated by the dedicated C-RNTI and performs the transmission after the subframe 27, then the network element 2 neglects the DCI or does not keep the resource information and the HARQ information carried by the DCI as the processing of the dynamic scheduling.

The embodiment three: what the present embodiment describes is the situation that the network element 2 obtains the resource information HARQ information, etc., used in the plurality of subframes through the C-RNTI, wherein, the resource information, HARQ information, etc. is transferred in the dedicated DCI format.

In step 1, the network element 2 obtains the DCI sent by the network element 1 through the C-RNTI on the downlink control channel to indicate the network element 2 to perform the transmission. Here the C-RNTI is the same as that in the embodiment one, and also the same as the C-RNTI in the dynamic scheduling.

Here is the transmission is the first transmission or retransmission of the HARQ. The DCI is the dedicated DCI of the scheduling method of the present invention. The network element 2 receives the DCI, which means that the network element 1 starts to adopt the method of the present invention to schedule the network element 2.

Here, the dedicated DCI refers to at least one of the DCIs carrying the identifier, the number of the subframes, a plurality of resource information and a plurality of HARQ information indicating to start adopting the scheduling method of the present invention. Wherein, the resource information refers to the resource block information, the MCS information, the transmitting power information, etc.; and the HARQ information refers to the NDI information, the RV information, the HARQ process information, etc.

Here, if the dedicated DCI does not carry the number of the subframes, it means that before this step, the network element 2 already obtains the number of the subframes through the protocol predefining, or the RRC signaling or the MAC control element; or the network element 2 can obtain the number of the subframes according to the number of the pieces of a plurality of resource information and a plurality of HARQ information.

In step 2, the network element 2 performs the transmission over the designated subframe according to the resource information, HARQ information, etc., carried in the DCI.

Here, if the DCI carries one piece of resource information and one piece of HARQ information, then the behavior of the network element 2 is similar to the behavior in step 3 in embodiment two, and will not go into details here one by one.

Here, if the DCI carries a plurality of pieces of resource block information, then it indicates that the network element 2 occupies the plurality of pieces of the resource block information sequentially over the designated subframe and the continuous subframe, rather than the same resource block information. Similarly, if the DCI carries a plurality of pieces of MCS information, then it indicates that the network element 2 adopts the plurality of pieces of the MCS information sequentially. If the DCI carries a plurality of pieces of transmitting power information, then it indicates that the network element 2 adopts the plurality of pieces of the transmitting power information sequentially. If the DCI carries a plurality of pieces of NDI information, then it indicates that the network element 2 performs the first transmission or retransmission according to the plurality of pieces of the NDI information. If the DCI carries a plurality of pieces of RV information, then it indicates that the network element 2 adopts the plurality of pieces of the RV information sequentially. If the DCI carries a plurality of pieces of HARQ process information, then it indicates that the network element 2 occupies the HARQ process indicated by the plurality of pieces of the HARQ process information sequentially In step 3, when the number of the subframes is reached, it means that the network element 1 finishes adopting the scheduling method of the present invention to schedule the network element 2 to transmit.

Here, besides reaching the number of the subframes, there are the following ways to indicate that the network element 1 finishes adopting the scheduling method of the present invention to schedule the network element 2 to transmit:

the way 1: the network element 2 receives the DCI in the current format.

The way 2: if the dedicated DCI carries an identifier indicating to start adopting the scheduling method of the present invention in step 1, then the network element 2 receives the dedicated DCI carrying the identifier indicating to finish adopting the scheduling method of the present invention.

The way 3: the network element 2 receives the DCI which does not carry the resource block information. The DCI is the DCI in the current format or the dedicated DCI.

The network element 1 and the network element 2 have the following combination: the network element 1 is a base station DeNB, the network element 2 is a relay node RN, and the downlink control channel is an R-PDCCH; the network element 1 is a base station eNB, the network element 2 is a user equipment UE, and the downlink control channel is a PDCCH; the network element 1 is a relay node RN, the network element 2 is a user equipment UE, and the downlink control channel is a PDCCH.

A scheduling system includes a scheduling unit and a transmitting/receiving unit; wherein, the scheduling unit is configured to schedule a network element 1 to transmit downlink message to a network element 2, and schedule the network element 2 to transmit or receive data over a plurality of subframes. The transmitting/receiving unit is configured to, according to the downlink message, to transmit or receive data over the plurality of subframes by using same or different scheduling information by the network element 2.

Here, the scheduling unit is further configured to explicitly or implicitly perform schedule indicating by the network element 1 to schedule the network element 2 to transmit or receive data over one subframe; or, schedule the network element 2 not to transmit or receive data.

Here, the scheduling unit is further configured to transmit the downlink message to the network element 2 through the network element 1, and perform the explicit schedule indicating; or the scheduling unit is further configured to perform the implicit schedule indicating by judging whether a timer maintained by the network element 2 is expired.

Here, the Chinese and English of the above characters involved are explained as: the subframe is represented as subframe; the period is represented as periodicity; the TTI bundling is represented as TTI bundling; the relay is represented as relay; the backhaul link is represented as backhaul link; and the access link is represented as access link.

The above description is only for the embodiments of the present invention and is not intended to limit the protective scope of the present invention.

INDUSTRIAL APPLICABILITY

In the present invention, the downlink message is transmitted to the network element 2 through the network element 1 to schedule the network element 2 to transmit or receive data over the plurality of subframes; the network element 2 transmits or receives data over the plurality of sub-frames by using the same or different scheduling information according to the downlink message, thus the scheduling for various network element can be achieved compatibly, and the present invention is commonly suitable for scheduling various network elements.

What we claim is:

1. A scheduling method, comprising:
    a Base Station (BS) as the network element 1;
    a Relay Node (RN) as the network element 2, wherein the RN relay the communication between the BS and User Equipments (UEs);
    wherein between the network element 1 and the network element 2 the communication is through wireless connection;
    before the network element 1 transmitting a radio resource control (RRC) signaling or a media access control (MAC) control element which carries information about a number of the plurality of subframes to the network element 2; or, information about the number of the plurality of subframes being preset in a protocol;
    the network element 1 transmitting downlink message to the network element 2, and scheduling the network element 2 to transmit or receive data over multiple subframes; and
    when the downlink message carries one scheduling information, the network element 2 transmitting or receiving data over said multiple subframes using the same scheduling information;
    when the downlink message carries multiple scheduling information, the network element 2 transmitting or receiving data over said multiple subframes using different scheduling information.

2. The method according to claim 1, wherein, the scheduling information comprises: at least one of resource block information, modulation and coding scheme information, transmitting power information, new data indicating information, redundancy version information and hybrid automatic repeat request (HARQ) process information.

3. The method according to claim 1, wherein, the downlink message is downlink control information (DCI) indicated by a radio network temporary identifier (C-RNTI), or DCI indicated by a dedicated C-RNTI, or dedicated DCI indicated by a C-RNTI, or dedicated DCI indicated by a dedicated C-RNTI.

4. The method according to claim 3, wherein, when the downlink message is the DCI indicated by the C-RNTI, the method further comprises: before the network element 1 transmits the downlink message to the network element 2, the network element 1 transmitting an RRC signaling or a MAC control element carrying identification information which activates the scheduling to the network element 2.

5. The method according to claim 3, further comprising: the dedicated C-RNTI being carried in an RRC signaling or a MAC control element; and the network element 1 transmitting the RRC signaling or the MAC control element to the network element 2.

6. The method according to claim 3, wherein, the dedicated DCI comprises any one or a combination of at least one of following information:

information 1: carrying an identifier indicating to start the scheduling;
information 2: the number of the plurality of subframes;
information 3: a plurality of pieces of associated resource information when the network element 2 transmits or receives the data over the plurality of subframes;
information 4: a plurality of pieces of associated HARQ information when the network element 2 transmits or receives the data over the plurality of subframes.

7. The method according to claim 6, wherein, the resource information comprises: at least one of resource block information, modulation and coding scheme information, and transmitting power information; and the HARQ information comprises: at least one of new data indicating information, redundancy version information, and HARQ process information.

8. The method according to claim 1, further comprising:
    the network element 1 explicitly or implicitly performing schedule indicating to schedule the network element 2 to transmit or receive the data over one subframe; or to schedule the network element 2 not to transmit or receive the data.

9. The method according to claim 8, further comprising: transmitting the downlink message to the network element 2 through the network element 1 to perform the schedule indicating explicitly.

10. The method according to claim 8, further comprising: performing the schedule indicating implicitly by judging whether a timer maintained by the network element 2 is expired; when determining that the timer maintained by the network element 2 is expired, scheduling the network element 2 to transmit or receive the data over one subframe; or, scheduling the network element 2 not to transmit or receive the data.

11. A scheduling system, comprising: a scheduling unit and a transmitting/receiving unit; wherein, before the scheduling unit implemented in a network element 1 transmits a radio resource control (RRC) signaling or a media access control (MAC) control element which carries information about a number of the plurality of subframes to the network element 2; or, information about the number of the plurality of subframes being preset in a protocol;
    the scheduling unit transmits downlink message to a network element 2 schedule the network element 2 to transmit or receive data over multiple subframes; and
    the transmitting/receiving unit is implemented in a network element 2 and when the downlink message carries one scheduling information, said transmitting/receiving unit transmits or receives data over the multiple subframes by using the same scheduling information;
    when the downlink message carries multiple scheduling information, said transmitting/receiving unit transmits or receives data over said multiple subframes using different scheduling information;
    wherein the network element 1 comprises a Base Station (BS), and the network element 2 comprises a Relay Node (RN) and between the network element 1 and the network element 2 the communication is through wireless connection;
    wherein the RN relay the communication between the BS and User Equipments (UEs).

12. The system according to claim 11, wherein, the scheduling unit is further configured to explicitly or implicitly perform schedule indicating by the network element 1 to schedule the network element 2 to transmit or receive the data over one subframe; or to schedule the network element 2 not to transmit or receive the data.

13. The system according to claim 12, wherein, the scheduling unit is further configured to transmit the downlink message to the network element 2 through the network element 1 to perform the schedule indicating explicitly; or, the scheduling unit is further configured to perform the schedule indicating implicitly by judging whether a timer maintained by the network element 2 is expired.

* * * * *